W. H. BROWNING.
RESILIENT VEHICLE RUNNING GEAR.
APPLICATION FILED AUG. 28, 1911.

1,066,378.

Patented July 1, 1913.

WITNESSES
Edw. Thorpe
C. F. Murdock

INVENTOR
William H. Browning
BY
Munn & Co
ATTORNEYS

UNITED STATES PATENT OFFICE.

WILLIAM H. BROWNING, OF NEW YORK, N. Y.

RESILIENT VEHICLE RUNNING-GEAR.

1,066,378.      Specification of Letters Patent.      Patented July 1, 1913.

Application filed August 28, 1911. Serial No. 646,447.

*To all whom it may concern:*

Be it known that I, WILLIAM H. BROWNING, a citizen of the United States, and a resident of the city of New York, borough of Manhattan, in the county and State of New York, have invented a new and Improved Resilient Vehicle Running-Gear, of which the following is a full, clear, and exact description.

Among the principal objects which the present invention has in view are: to provide means for mounting the wheels of a vehicle to permit the said wheels to avoid shocks or sudden lift thereof without transmitting the shock or lift to the body of the vehicle; to provide a mounting for the wheels of a vehicle, which mounting will accommodate itself readily to road inequalities and prevent the too rapid return or oscillation of the wheel and parts connected therewith; and to simplify the construction of the running gear.

One embodiment of the present invention is disclosed in the structure illustrated in the accompanying drawings, in which like characters of reference denote corresponding parts in all the views, and in which—

Figure 1:
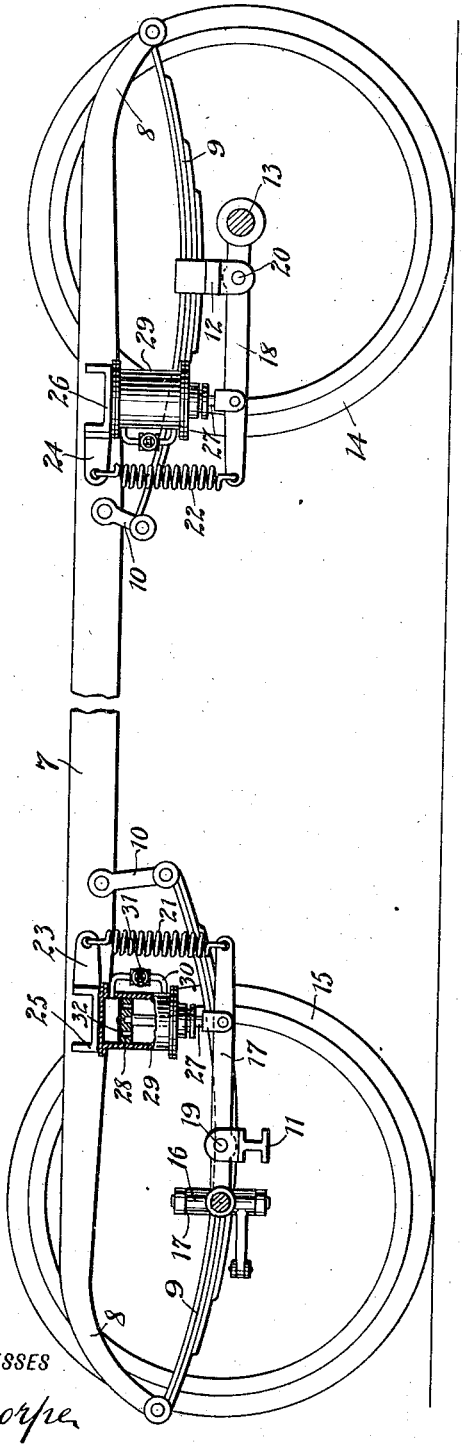
Figure 2:
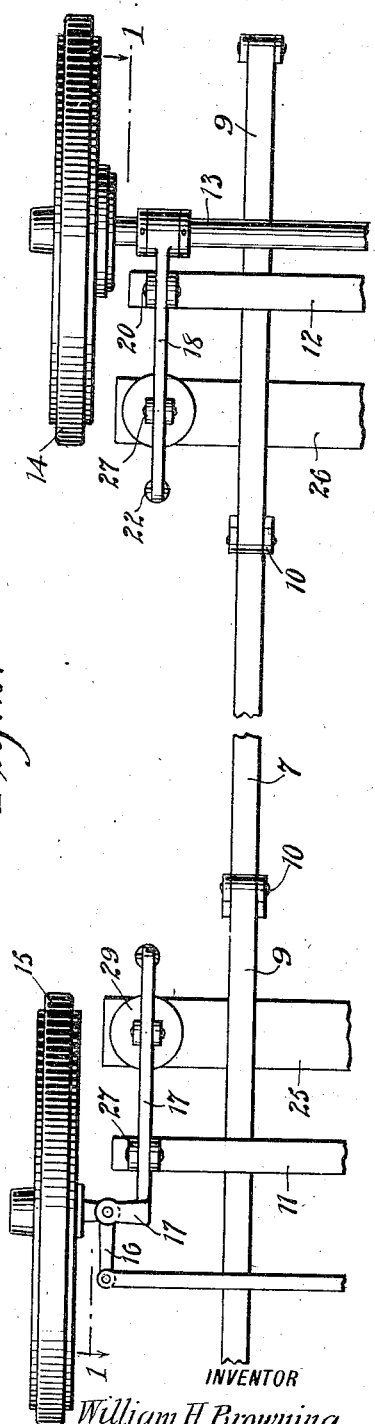

Figure 1 is a vertical longitudinal section of a running gear constructed and arranged in accordance with the present invention, the section being taken on the line 1—1 in Fig. 2; and Fig. 2 is a plan view of the structure shown in Fig. 1 as seen from beneath.

As seen in the accompanying drawings, the side bars 7 are constructed in any preferred form, such as that having the downwardly bowed ends 8 to receive the leaf springs 9. The springs 9, as shown in the drawings, are secured to the side bars 7 by means of the swinging links 10 in the manner usual in this class of construction. The normal weight of the body is carried on the springs 9. In the present disclosure the middle of the springs 9 at the front of the vehicle is strapped or otherwise secured to the front axle 11 in any suitable manner. At the rear of the vehicle the springs are strapped to a cross bar 12 which is disposed in advance of the axle 13. The disclosure being illustrated as applied to the running gear for an automobile, the axle 13 is used as a driving axle, the driving wheels 14 being secured directly thereto. The steering wheels 15 are mounted on vertical pivots 16 in a manner usual in automobile construction. The pivots 16 are upset at the forward end of the hanger levers 17 and 18, the distance from the center of the axle bearing of the said wheels to the center of the axle 11 being equal to the center of the axle bearing of the wheels 14 from the center of the cross bar 12.

The hanging levers 17 and 18 are employed to form an easy yielding support for the wheels 15 and 14 to compensate for the pneumatic tire which it is the object of the present invention to supplant. The levers 17 and 18 are provided with pivots 19 and 20 respectively. At the ends of the levers 17 and 18, opposite the attachment thereto to the carrying wheels, are secured the hanger springs 21 and 22 respectively. The springs 21 and 22 are hung from brackets 23 and 24 respectively, which are extended from the added cross bars 25 and 26. The increased leverage of the levers 17 and 18 on the sides supported by the springs 21 and 22 provides for the use of sensitive springs 21 and 22 which quickly respond to the action of the wheels 15 and 14 in riding an obstruction encountered on the road.

Intermediate the ends of the levers 17 and 18, to which are attached the springs 21 and 22 and the pivots 19 and 20 of the said levers, are pivotally connected the piston rods 27 of the pistons 28. The pistons 28 are each mounted in a cylinder 29 and form in conjunction therewith a dash-pot or shock absorber. The upper and lower ends of the cylinders 29 are connected by a by-pass pipe 30, the passage through which is controlled by the valve 31.

The pistons 28 are suitably perforated, the perforations being normally covered by a rubber, leather, or other suitable flexible flap 32. When in the operation of the dashpot the piston rods 27 and pistons 28 are drawn down the flaps 32 lift to permit the air or other fluid contained in the cylinder 29 free access to the end of the cylinder above the piston 28. When, however, the liquid having passed above the flap 32 the piston undertakes to return to the upper end of the cylinder 29, the liquid is compelled to travel through the by-pass pipe 30. The resistance of the pipe 30 retards the movement of the piston 28 and parts connected therewith.

In the operation of a vehicle running gear constructed and arranged as herein described, the carrying wheels are enabled to override an obstruction without its being necessary to lift the body of the vehicle or to materially compress the carrying springs 9 thereof. When the obstruction is encountered by the wheel, the latter in rising pulls upon the hanger springs 21 and 22, the same yielding to compensate for the movement of the opposite end of the levers 17 or 18, as the case may be, and wheels connected therewith. The lift of the wheels which depresses the end of the levers 17 and 18 to which the springs 21 and 22 are connected, is not retarded by the pistons 28, and in consequence thereof resistance is added to the pull of the said springs 21 and 22. When, however, in running over a road one of the wheels would pass a hollow in the said road, the tendency of the wheel to drop into the hollow is overcome by the piston 28 slowing the movement of the levers supporting said wheel. The result of this action of the hanger springs and dashpot is to steady the travel of the body of the vehicle and to absorb the shock of the road obstructions without transmitting same to the body of the vehicle and the carrying springs therefor.

It will be observed that by this construction that there are interposed between the carrying wheels and the body of the vehicle the springs 9, 9 and 21 and 22, the interposed levers 17 and 18 operating mutually upon both the said springs. Thus a portion of each shock is transmitted to the springs 9, 9 although the major portion is transmitted to the springs 21 and 22. The holding pull, however, of the springs 21 and 22 is exerted directly upon the body of the vehicle. The result of this, with an accelerated movement of the wheels 15 and 14, operates to draw down through the intermediary of the springs 21 and 22 upon the body of the vehicle as the said wheels are lifted. In this event it will be observed that the inertia of the body holds the same as an anchorage or base for the expansion or contraction of both the said springs 9, 9 and 21, 22, and this action due in the first instance to the inertia of the body is augmented by the balance of the said springs, the lift of the one being compensated by the depression of the other.

Having thus described my invention, what I claim as new and desire to secure by Letters Patent is:—

In a vehicle running gear such as described, the combination of a plurality of parallel axles; a plurality of carrying wheels mounted on one of said axles; a plurality of carrying springs rigidly mounted on the other of said axles; a plurality of levers operatively connecting said axles, said levers being fulcrumed on the axle directly connected with said carrying springs; a plurality of springs connected with the free end of said levers to support the same; and a plurality of dashpots having pistons and piston rods, said piston rods being pivotally connected with said levers intermediate the fulcrum and free end thereof, to control the speed of movement of said levers, and to form a second fulcrum for said levers when said carrying springs yield at a speed greater than the speed of said pistons.

In testimony whereof I have signed my name to this specification in the presence of two subscribing witnesses.

WILLIAM H. BROWNING

Witnesses:
E. F. MURDOCK,
PHILIP D. ROLLHAUS.